Oct. 22, 1957

J. B. McGAY 2,810,303

VARIABLE DRIVE TRANSMISSION UNIT

Filed May 28, 1954

INVENTOR
John B. McGay

BY Strauch, Nolan & Diggins

ATTORNEYS

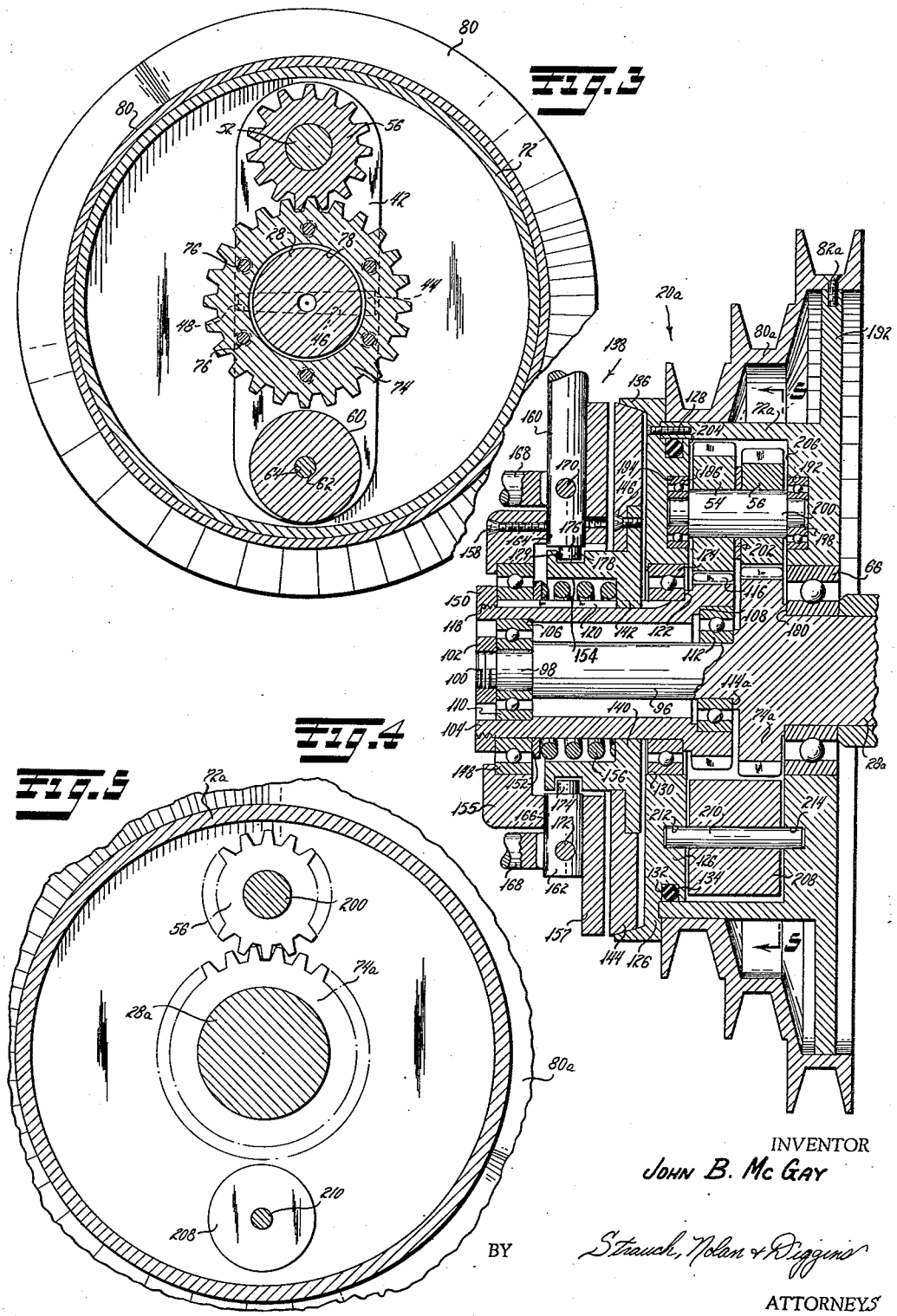

United States Patent Office 2,810,303
Patented Oct. 22, 1957

2,810,303

VARIABLE DRIVE TRANSMISSION UNIT

John B. McGay, Tulsa, Okla.

Application May 28, 1954, Serial No. 433,035

4 Claims. (Cl. 74—781)

The present invention relates to power transmission means whereby power transmitted from a prime mover to a drive shaft can be readily varied over a wide range of speeds, and more particularly to a variable drive pulley unit.

Most machine tools such as lathes, drills, tapping machines, and other similar applications, require a wide range of speeds for effective day to day operation. Electric motors in general use with machine tools and like equipment are single speed types, and a range in speeds is usually accomplished by special variable drive apparatus such as back gear systems, special gear boxes, pulley systems and the like. These special drive apparatus are expensive to construct thus considerably increasing the cost of the machine tool or like equipment. Further, the machine must be stopped for manipulation of parts to change speeds, and this is particularly disadvantageous on a job requiring two alternate speeds at frequent intervals, for example, where a very deep rough cut on a work piece is immediately followed by a light finishing cut.

To obviate some of the disadvantages of such variable drive apparatus, two-speed electric motors have been incorporated in some machine tools so that motor or machine need not be stopped to effect a change in speed. However, not only are two-speed motors more expensive, but use of a two-speed motor is not fully satisfactory because less than the total horsepower of the motor is available at the lower speed when the need for full power from the prime mover is usually the greatest. Thus if a full and half induction speed motor is used, the power available at the machine at half speed is only one-half of the full motor horsepower.

Due to the aforesaid problems, there has been some effort by the art to develop power transmission pulleys having two independent ranges of speeds, and an example of a recent prior development is shown in U. S. Patent No. 2,399,451, issued to Edward C. Rothacker on April 30, 1946. However, such prior devices do not provide speed changes during power transmission but require that the machine be stopped, and have also failed to provide a number of other structural and operational features required in a commercially satisfactory device of this type, as will be apparent from the following discussion of the present invention.

It is a principal purpose of the present invention to provide a power transmission unit which is complete in itself and can be used as a substitute for prior type power transmission systems to give multiple speed variation.

It is a primary object of the present invention to provide a novel self-contained unit for transmission of power between a prime mover and a driven member wherein rotational speeds of the latter may be readily changed even when power is being transmitted and the machine is operating.

Another object of the present invention is to provide a pulley unit for transmission of power from a prime mover to a working shaft or like member wherein the working shaft can be caused to rotate at either of two predetermined speeds with unchanged speed of the prime mover even while the machine is operating, through a simple shift of a lever or like device.

Another object is to provide a two speed power transmitting pulley unit wherein the total available horsepower of the prime mover can be transmitted at either speed.

Another object of the present invention is to provide a variable drive pulley unit fitted with only four spur-type gears, which are relatively inexpensive to produce, with a novel application of epicyclic gear trains in an arrangement which lends itself to construction of a unit which will operate at any predetermined ratio between 1:2 and 1:50; and wherein the two respective speeds of rotation may be in the same or the opposite direction by selective placement of said gears.

Another object of the present invention is to provide a power transmission unit capable of a multiple speed output having a novel clutch engaging arrangement whereby the change in output speed can be accomplished smoothly and without any possibility of damage to the gear train, even during operation of the machine and prime mover.

Another object of the present invention is to provide a power transmission unit having a novel clutch and gearing arrangement whereby manufacturers of it can use a basic assembly with standardized sub-components and alter the speed ratio of the unit over a very wide range through change of only a few gears, thereby making possible economical production of units having widely varying speed ratios to meet different needs, thus giving the present invention important cost and competitive advantages.

Another object of the present invention is to provide a power transmission pulley unit for variable speed applications having a spring loaded clutch with a novel arrangement whereby the spring loading of the clutch does not impart an axial thrust on any bearing carrying load during rotational operation so that relatively inexpensive, standard production ball bearing units can be used in making the pulley unit of this invention, and bearing wear and maintenance problems are substantially minimized.

A further object of this invention is to provide a pulley as described in which all bearings are sealed ball bearings which require no lubrication or maintenance other than a minimum amount of gear grease.

Another object of the present invention is to provide a power transmission "driver" pulley unit embodying the aforesaid advantages suitable for placement on the prime mover to drive a machine tool or the like; and to provide a "driven" pulley unit of the same essential construction and mode of operation, and having the same advantages, for placement on a machine tool or the like to be driven from said power source.

Many other and further objects, advantages and features of the present invention will become apparent from the following specification when considered in connection with the accompanying drawings and claims forming a part thereof.

In the drawings, which illustrate two preferred practical embodiments of the present invention:

Figure 3 is a cross-sectional view taken on the line 3—3 of Figure 2;

Figure 4 is a longitudinal sectional view through a variable speed "driven" pulley which is a modification of the present invention; and Figure 5 is a sectional view taken on the line 5—5 of Figure 4.

Figure 1:
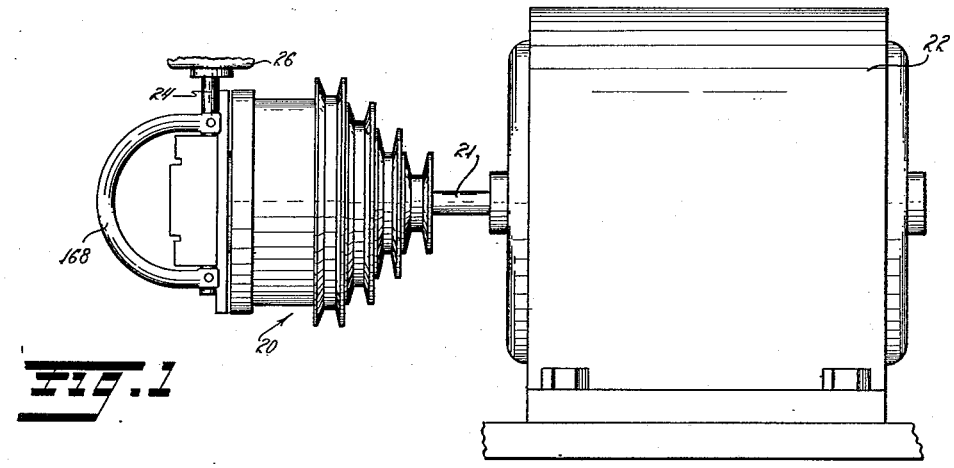
Figure 1 is an elevation view of a variable speed power transmission "driver" pulley of the present invention, mounted on the shaft of an electric motor.
Figure 2:
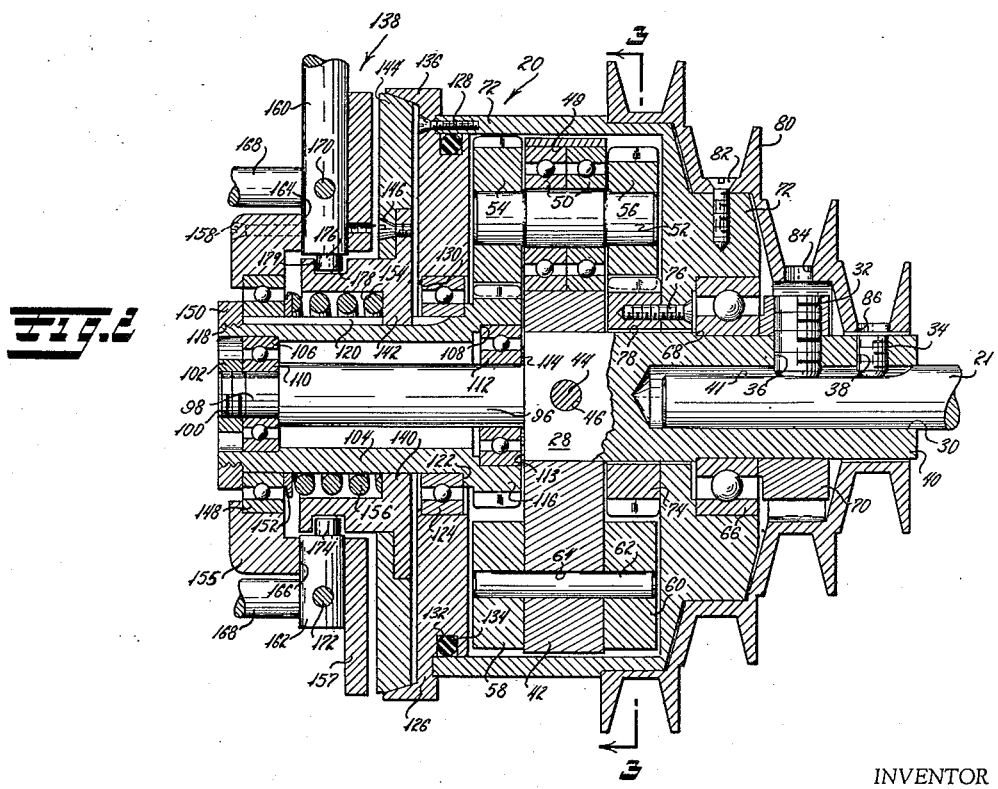
Figure 2 is a longitudinal sectional view through a variable speed "driver" pulley embodying the present invention.

Referring to the drawings, Figures 1 to 3, the apparatus disclosed therein comprises a variable speed pulley unit, generally indicated at 20, mounted on output shaft 21 of a suitable prime mover such as electric motor 22, and having a laterally extending shaft 24 which is in operative engagement with a stop 26 or like means on the frame of the machine (not shown) with which the variable speed unit 20 is used.

Referring more particularly to Figures 2 and 3, the pulley unit 20 comprises a center shaft 28 having a central bore 30 so that it can be non-rotatably mounted on motor shaft 21 by means of set screws 32 and 34 extending through holes 36 and 38, respectively, in the cylindrical portion 40 of the center shaft 28 and engaging the flattened surface 41 of the motor shaft 21. Center shaft 28 has a cross member 42 secured thereto by a taper pin 44 seated in tapered holes 46 and 48 in parts 28 and 42 respectively. Cross member 42 has an enlarged bore 49 at one end in which a pair of ball bearings 50 are mounted by a press fit between their outer races and bore 49, or by other suitable means. A stepped shaft 52 is secured to the inner races of bearings 50 by press fit and a pair of gears 54 and 56 are press fitted or otherwise suitably mounted on the ends of shaft 52 on the opposite sides of cross member 42, thus forming a gear cluster which is free to rotate with respect to member 42. For dynamic balance, the said gear cluster is counterbalanced by a pair of counterweights 58 and 60 mounted on the opposite sides of cross member 42 on the ends of pin 62 secured in bore 64 of member 42.

A ball bearing 66 is held in place on shaft 28 between shoulder 68 and retaining ring 70 which is secured to the shaft by set screw 32. Bearing 66 supports on its outer race the annular base of a generally cup-shaped housing 72 having a gear 74 fixed thereon by screws 76 in mesh with the teeth of gear 56, with a suitable clearance being provided at 78 to permit rotation of housing 72 and gear 74 relative to center shaft 28. A step pulley 80 of conventional type is secured to housing 72 by one or more screws 82 and has holes 84 and 86 providing access to set screws 32 and 34, respectively.

Shaft 28 has a pair of extensions 96 and 98 of progressively reduced diameter with extension 98 being threaded at its end 100 to receive a retaining nut 102. A sleeve 104 having internal shoulders 106 and 108 is rotatably mounted concentric with shaft 28 on the outer races of ball bearings 110 and 112 in a manner which is clearly apparent from Figure 2, with a spacer washer 114 providing clearance between shoulder 113 of shaft 28 and cross member 42, and the adjacent portions of bearing 112 and sleeve 104. Sleeve 104 is fitted at one end with a gear 116, the teeth of which mesh with the teeth of gear 54, and is threaded at its other end at 118. The sleeve also has a longitudinally extending spline 120 and an external shoulder 122. A ball bearing 124 fits closely over the exterior of sleeve 104 with its inner race in abutment with shoulder 122 and its outer race supporting an annular housing closure member 126 which is secured to the end of the cylindrical housing section 72 by means of screws 128 and has a shoulder 130 in abutment with the outer race of bearing 124. By this structure, pulley unit housing 72 is mounted at both ends on bearings 64 and 124 for rotation relative to shaft 28. An annular groove 132 and sealing ring 134 may be provided in the periphery of closure member 126 to seal housing 72. Closure member 126 also has on its periphery a clutch ring 136 for cooperating with the clutch and brake assembly generally indicated at 138.

The clutch assembly 138 comprises a clutch sleeve 140 closely fitted over splined sleeve 104 with a projection 142 received in spline 120, and having a clutch plate 144 secured to sleeve 140 by screws 146. A ball bearing 148 is fixed on sleeve 104 and retained longitudinally between nut 150 and washer 152. Clutch sleeve 140 has an enlarged central bore 154 receiving a compression spring 156 bearing against washer 152 and urging the clutch plate 144 into engagement with clutch ring 136. The outer race of bearing 148 supports a brake sub-assembly comprising ring 155 to which a brake shoe 157 is secured by screws 158. The brake sub-assembly is fitted with a pair of rods 160 and 162 which are rotatably mounted in holes 164 and 166 in ring 155 and are respectively connected by a spanner 168 secured thereto by pins 170 and 172. As clearly illustrated in Figure 2, rods 160 and 162 are coaxial and disposed transverse of the transmission axis. Each of rods 160 and 162 is provided with eccentric end projections 174 and 176 extending into an annular groove 178 on the exterior of clutch sleeve 140. Shaft 160 has an extended portion 24 which is in operative engagement with a stop 26 or like suitable means on a machine tool (not shown) and serves to keep the brake sub-assembly from rotating with the pulley assembly.

In operation, when clutch plate 144 is in engagement with clutch ring 136, as shown in Figure 2, sleeve 104 and gear 116 are locked to pulley housing 72 and will rotate with the housing and pulley 80. Since gear 74 is fixed to housing 72, cross arm 42 cannot rotate relative to gears 116 and 74 because of the difference in size and number of teeth between pinions 54 and 56. As a result, center shaft 28 is non-rotatably locked to housing 72 through parts 42, 52, 104 and 144 so that pulley 80 rotates with shaft 28 at the rotational speed of motor shaft 21, whereby the pulley unit has a 1:1 speed ratio. With the clutch plate 144 in this position, none of the ball bearings is rotating except 148. Bearing 148 is free of any thrust load imposed by compression spring 156 such load being absorbed by bearings 110, 112, 124 and 66 which are non-rotating at this time.

When spanner 168 is displaced by the operator thereby turning shafts 160 and 162, the eccentrics 174 and 176 bear against sides 179 of groove 178 to move the clutch plate 144 against the bias of spring 156 out of engagement with clutch ring 136 and into engagement with brake shoe 157. This stops rotation of clutch plate 144, splined sleeve 104 and gear 116 and locks sleeve 104 and gear 116 in fixed position so that cross arm 42 rotates with respect to the latter causing pinions 54 and 56 to rotate in bearings 50. This causes gear 74 to rotate thereby rotating housing 72 and pulley 80 relative to shafts 21 and 28 at a ratio and in a direction dependent on the sizes of gears 116, 54, 56 and 74, with said ratio being determinable as explained below. In this clutch position, all bearings are rotating except bearing 148, and all thrust load imposed by spring 156 is absorbed by non-rotating bearing 148 with no axial thrust being applied to rotating bearings 110, 112, 124 and 66.

As a result of the above novel construction, axial thrust load due to compression spring 156 is not imposed on operating bearings in either clutch position. Spring 150 must be quite heavy to exert sufficient pressure to hold the clutch plate 144 in engagement with rings 136. Hence, removal of its thrust load from the rotating bearings is very advantageous since it minimizes friction losses and wear on the bearings, and minimizes operating and maintenance costs.

The above described gearing arrangement is essentially an epicyclic gear train and the speed ratios to be obtained may be calculated as follows: With gear 116 locked to non-rotating brake shoe 156, one revolution of motor shaft 21, center shaft 28 and rotor 42 will produce $1-(N_{116}/N_{54} \times N_{56}/N_{74})$ revolutions of pulley 80, where N equals the number of teeth on gears 116, 54, 56 and 74, respectively, as indicated by the sub-scripts. To illustrate, if $N_{116}$ equals 26; $N_{54}$ equals 18; $N_{56}$ equals 16; and $N_{74}$ equals 28; then one revolution will produce $$1-(26/18 \times 16/28) = +.175$$

revolution of the pulley, or a ratio of 1:5.7. When the result of this formula comes out a plus figure, as in this instance, the slow speed rotation of the pulley is in the same direction as at high speed and in the same direction as rotation of motor shaft 21.

To obtain reverse rotation of the pulley at low speed, the gearing is changed during construction, e. g., so that $N_{116}$ equals 28; $N_{54}$ equals 16; $N_{56}$ equals 18; and $N_{74}$ equals 26. Then one revolution of the center shaft 28 and rotor 42 would produce $1-(28/16 \times 18/26) = -.212$ revolution of the pulley, or a ratio of $-1:4.7$. Since the result of the formula is negative in this instance this indicates that the slow speed of the pulley will be in reverse direction to rotation of the pulley at high speed, and opposite to rotation of drive motor shaft 21.

The gearing arrangement of the variable drive pulley of the present invention makes possible a very wide range in speed ratios between motor shaft 21 and pulley 80. A 1:2 ratio can be obtained with gearing such that $N_{116}$ equals 40; $N_{54}$ equals 20; $N_{56}$ equals 30; and $N_{74}$ equals 30. A very high ratio can also be achieved; for example, the gear train could be such that $N_{116}$ equals 50; $N_{54}$ equals 30; $N_{56}$ equals 30; and $N_{74}$ equals 51. In the latter case, the resultant revolutions of the pulley would be $1-(50/30 \times 30/51) = .02$ revolution of the pulley per motor revolution, or a ratio of 1 to 50.

It will be noted that the results in ratio increase as the difference between the number of teeth and diameters of gears 116 and 74 decreases so that the same housing size can be used for a gear train giving speed ratios varying over a very wide range. This is not the case in other types of gearing.

The above-described variable drive pulley unit embodiment 20 of Figures 2 and 3 is intended for use as a "driver" unit mounted on the rotated shaft of a prime mover, with the pulley driving a pulley on the main drive shaft of a machine tool or the like through a belt. Figures 4 and 5 show a modification of the variable speed pulley unit of the present invention intended for use as a "driven" unit mounted on the main shaft of a machine tool or the like. For clarity, like parts will be numbered with the same numerals as in the embodiment of Figures 2-3 insofar as possible.

Referring to Figures 4 and 5, the "driven" pulley unit, generally indicated at 20a, comprises a center shaft 28a which may be provided with a central bore (not shown) so that it can be non-rotatably mounted on the main drive shaft of a machine tool or the like (not shown). A gear 74a and a pair of spaced shoulders or washers 114a and 190 are provided on the shaft 28a, and that shaft has a pair of extensions 96 and 98 of progressively reduced diameter with extension 98 being threaded at its end 100 to receive a retaining nut 102.

A bearing 66 is fixed on shaft 28a in abutment with shoulder 190 by a press fit or like means. Bearing 66 supports on its outer race one end of a generally cup shaped gear housing 72a, and a conventional step pulley 80a which is secured to annular base extension 192 of housing 72a by screws 82a. The gear housing is completed by an annular closure ring 126 which is secured to the open end of the cylindrical side wall of housing 72a by screws 128. The gear sleeve 104 and clutch and brake assemblies comprising the parts identified by numerals 96 through 179, inclusive, in "driven" unit 20a of Figures 4 and 5 are constructed and operate identically to like numbered parts of the above-described "driver" pulley unit 20 of Figures 2-3. By the structure shown and described, gear housing 72a is supported at both ends on bearings 66 and 124 for rotation relative to shaft 128a, similarly to housing 72 of "driver" pulley unit 20 in Figures 2-3.

The main difference between the "driven" pulley unit 20a and "driver" pulley unit 20 of Figures 4-5 and 3-4, respectively, is in the arrangement of the gear train. Referring to Figures 4 and 5, housing 72a and closure member 126 have aligned bores 192 and 194 in which ball bearings 196 and 198 are press-fitted. Opposite ends of a stepped shaft 200 are press-fitted in the inner races of bearings 196 and 198, and a pair of spur type gears 54 and 56 are non-rotatably mounted on shaft 200 in mesh with gears 116 and 74a respectively. Gears 54 and 56 are separated by a spacer washer 202 of substantially the same width as shoulder 114a, and suitable operating clearances are provided at 204 and 206. For dynamic balance, a counterweight 208 is mounted opposite shaft 200 on a small shaft 210 which is supported in bores 212 and 214 in the housing members 126 and 72a, respectively.

Operation of the "driven" variable speed pulley unit 20a is substantially like that of the driven unit 20 of Figures 4-5, but rotational power input to the unit is applied to pulley 80a, and 28a is the unit's power output shaft. When clutch plate 144 is in engagement with clutch ring 136, as shown in Figure 4, sleeve 104 and gear 116 are locked to pulley housing 72a and will rotate with the housing and pulley 80a. Since gears 54 and 56 differ in size and number of teeth, the shaft 200 in housing 72a cannot rotate. As a result, center shaft 28a is non-rotatably locked to housing 72a through parts 200, 126, 104 and 144 so that shaft 28a rotates with input pulley 80a at the rotational speed of pulley 80a, whereby the pulley unit 20a has a 1:1 speed ratio. Only bearing 148 is now rotating, and that bearing is free of any thrust load imposed by compression spring 156, such load being absorbed by non-rotating bearings 110, 112, 124 and 126.

When spanner 168 is displaced by the operator, to move the clutch plate 144 against the bias of spring 150 out of engagement with clutch ring 136 and into engagement with brake shoe 157, this locks sleeve 104 and gear 116 in non-rotatable fixed position. This permits housing 72a with shaft 200 to move about gear 116, causing pinions 54 and 56 to rotate in bearings 196 and 198. This in turn makes gear 74a rotate, thereby rotating shaft 28a at a speed ratio and in a direction dependent on the sizes of gears 116, 54, 56 and 74a, with said ratio being determinable as explained below. In this clutch position, all thrust imposed by spring 156 is absorbed by non-rotating bearing 148 with no axial thrust being applied to rotating bearings 110, 112, 124 and 66.

The ratio of speed of rotation of drive input pulley 80a to drive output shaft 28a in the "driven" pulley unit 20a is calculated similarly to determination of this ratio for the "driver" embodiment of Figures 2-3 as discussed above by use of the formula $$1-(N_{116}/N_{54} \times N_{56}/N_{74a})$$

It is also apparent that "driven" pulley unit 20a of Figures 4-5 has the advantageous features discussed in connection with the "driver" pulley unit 20 embodiment of Figures 2-3.

From the foregoing, it will be seen that: the present invention provides a novel variable speed power transmission pulley unit for power machinery wherein the rotational speeds may be easily and quickly changed even while the machinery and its prime mover are being operated, through simple shift of a lever, without damage to the gear train of the unit, and with the total prime mover horsepower being available at the machinery in all speed ratios; that the pulley unit of this invention enables speed ratios varying over a broad range and in the same or opposite direction, and lends itself to easy economical alteration of speed ratios in production; that the power transmission unit of the present invention has a novel clutch and bearing arrangement whereby axial load on the operating bearings is eliminated thereby enabling use of standard production ball bearings and minimizing friction, wear and maintenance on such bearings; and that the present invention embodies constructional features which may be applied with equal advantage to a "driver" power transmission unit for use on the prime mover or a "driven" unit for use on the machinery itself with equal advantage.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a power transmission: a shaft having means at one end adapted to be connected to a rotatable shaft; an epicyclic carrier fixed substantially midway on said shaft; a sole single planetary pinion set journalled in said carrier; a counterweight on said carrier diametrally disposed relative to said planetary pinion set; a drum surrounding said carrier and journalled on said shaft between said carrier and said one end; a sun gear fixed to said drum and meshing with said planetary pinion set; a sleeve shaft journalled on the other end of said shaft including a second sun gear meshing with said planetary pinion set; a clutch ring journalled on said sleeve shaft and fixed to said drum to therewith enclose said enmeshed sun gears and planet set; an axially shiftable clutch-brake plate splined to said sleeve shaft having a grooved collar rigid therewith; a spring coacting between the other end of said sleeve shaft and said clutch-brake plate to bias said clutch-brake plate into engagement with said clutch ring; a brake plate journalled in axially fixed relation on the other end of said shaft and on the opposite side of said clutch-brake plate from said clutch ring, and adapted to be fixed against rotation with said transmission; and lever means journalled in said brake plate coacting with said grooved collar for shifting said clutch-brake plate against spring bias from clutching engagement with said clutch ring to braking engagement with said brake plate.

2. A variable drive power transmission unit for a machine or the like, comprising: a rotatable shaft having first and second spaced bearings thereon with a splined sleeve supported thereon rotatable with respect to said shaft; third and fourth spaced bearings engaging and supported on said splined sleeve; a fifth bearing on said rotatable shaft spaced from said first and second bearings; a gear housing mounted on said fourth and fifth bearings whereby said housing is rotatable relative to said shaft and to said splined sleeve; means for causing said housing and shaft to selectively rotate together and relative to each other including an epicyclic gear train operatively connecting said housing and said shaft; a clutch ring on said housing; a brake member mounted on said third bearing whereby said brake member is rotatable and said shaft and said sleeve are relatively rotatable, said brake member having means for holding it non-rotatably fixed in space; a clutch plate splined to said sleeve and means located between said third bearing and said clutch plate and acting between said sleeve and said clutch plate normally resiliently biasing said clutch plate into engagement with said clutch ring causing said shaft and housing to rotate together whereby the speed ratio between shaft and housing is 1:1; means for moving said clutch plate out of engagement with said ring and into engagement with said brake member causing said shaft and housing to rotate relative to each other at a speed ratio differing from 1:1; with such clutch plate being operable between said clutch ring and brake member when said transmission unit is operating at both first and second speed ratios.

3. A variable drive power transmission unit as defined in claim 2, wherein said epicyclic gear train connecting said housing and shaft consists solely of: a first gear on said splined sleeve; a cross-member on said shaft and rotatable therewith; a gear cluster including second and third gears rotatably supported on said cross-member and rotatably as a unit with said second gear in mesh with said first gear; a fourth gear non-rotatably supported on said housing in mesh with said third gear; and a counterweight on said cross-member in diametrically opposed position to said gear cluster, for dynamic balance.

4. A variable drive power transmission unit as defined in claim 2, wherein said epicyclic gear train connecting said housing and rotatable shaft consists of: a first gear on said splined sleeve; a gear cluster including second and third gears on a shaft rotatable as a unit and rotatably supported on said housing, said shaft having its axis parallel to the axis of the above-mentioned rotatable shaft, with said second gear in mesh with said first gear; a fourth gear on said rotatable shaft in mesh with said third gear; and a counterweight supported in said housing in diametrically opposed position to said gear cluster, for dynamic balance.

References Cited in the file of this patent

UNITED STATES PATENTS

| 361,222 | Jones et al. | Apr. 12, 1887 |
| 403,756 | Jetter | May 21, 1889 |
| 405,290 | Zellers | June 18, 1889 |
| 577,065 | Pole | Feb. 16, 1897 |
| 588,356 | Rogers | Aug. 17, 1897 |
| 601,731 | Lufbery | Apr. 5, 1898 |
| 675,433 | Wilson | June 4, 1901 |
| 1,474,365 | Hupp | Nov. 20, 1923 |
| 1,789,940 | Geldhof | Jan. 20, 1931 |
| 1,828,540 | Marschke | Oct. 20, 1931 |
| 1,839,992 | Petrelli | Jan. 5, 1932 |
| 1,915,374 | Mobius | June 27, 1933 |
| 2,240,740 | Morgan | May 6, 1941 |
| 2,336,459 | Banker | Dec. 14, 1943 |
| 2,413,763 | Heyer | Jan. 7, 1947 |
| 2,533,056 | Selby | Dec. 5, 1950 |

FOREIGN PATENTS

| 453,682 | Italy | Dec. 9, 1949 |
| 531,494 | France | Oct. 25, 1921 |